Aug. 16, 1955　　　G. KODET ET AL　　　2,715,367
PUMP AND TURBINE FOR JET POWER UNIT
Filed April 6, 1949　　　　　　　　　　　　3 Sheets-Sheet 1
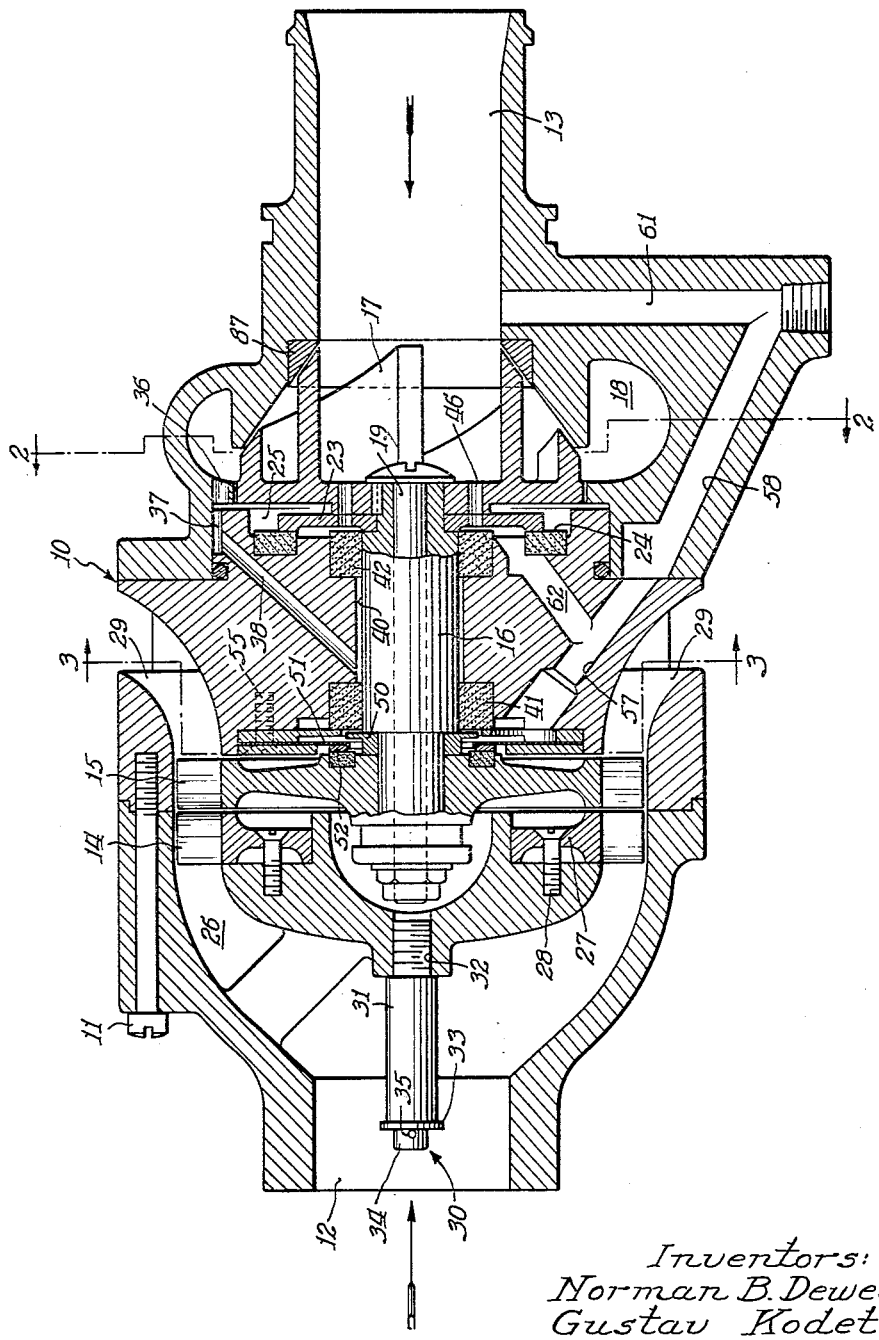
Inventors:
Norman B. Dewees
Gustav Kodet
Leland R. Melvin and
Louis G. Burns Aug. 16, 1955  G. KODET ET AL  2,715,367
PUMP AND TURBINE FOR JET POWER UNIT
Filed April 6, 1949  3 Sheets-Sheet 2
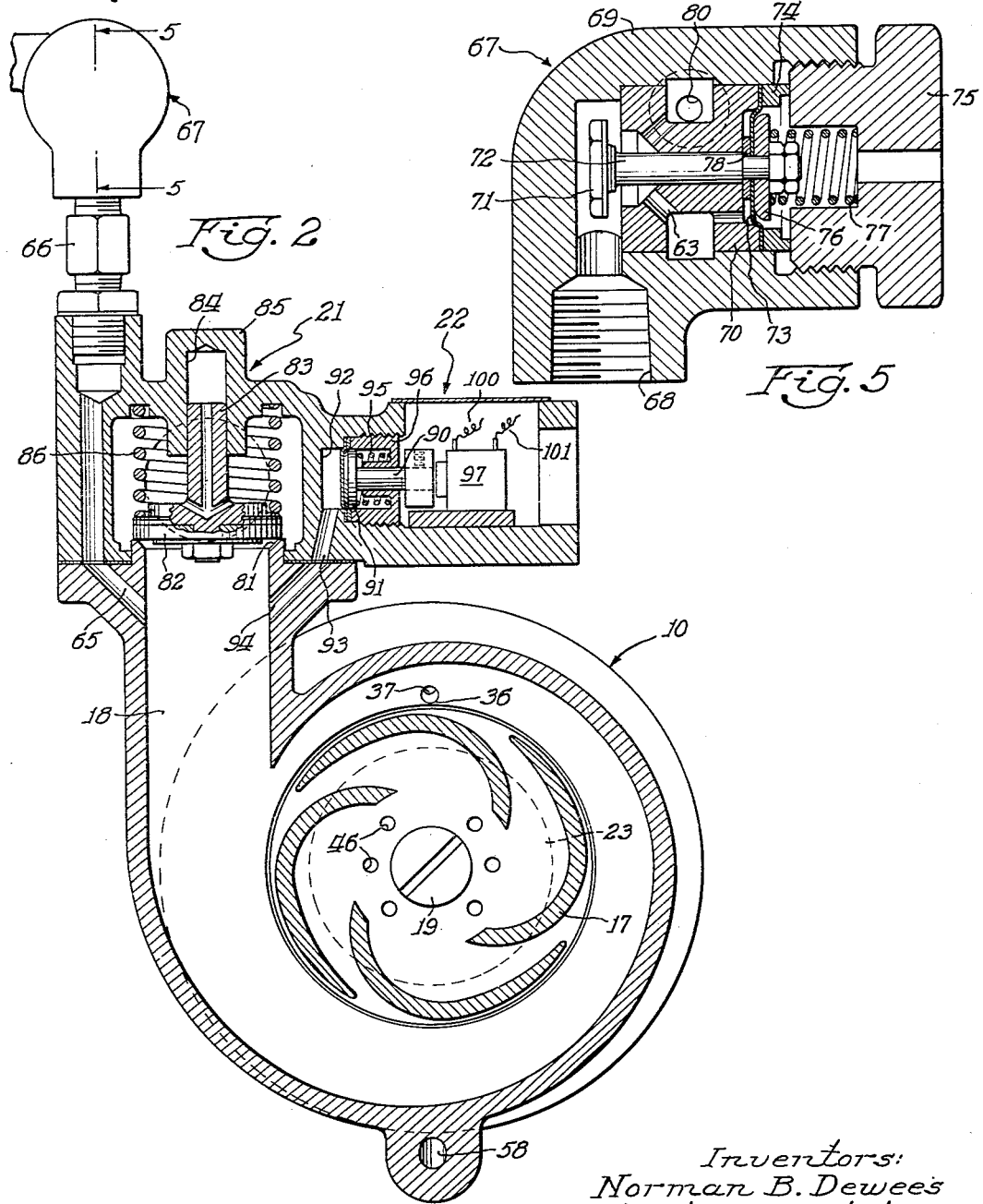
Inventors:
Norman B. Dewees
Gustav Kodet
Leland R. Melvin and
Louis G. Burns
By Edward P. Fitzhenry
Atty

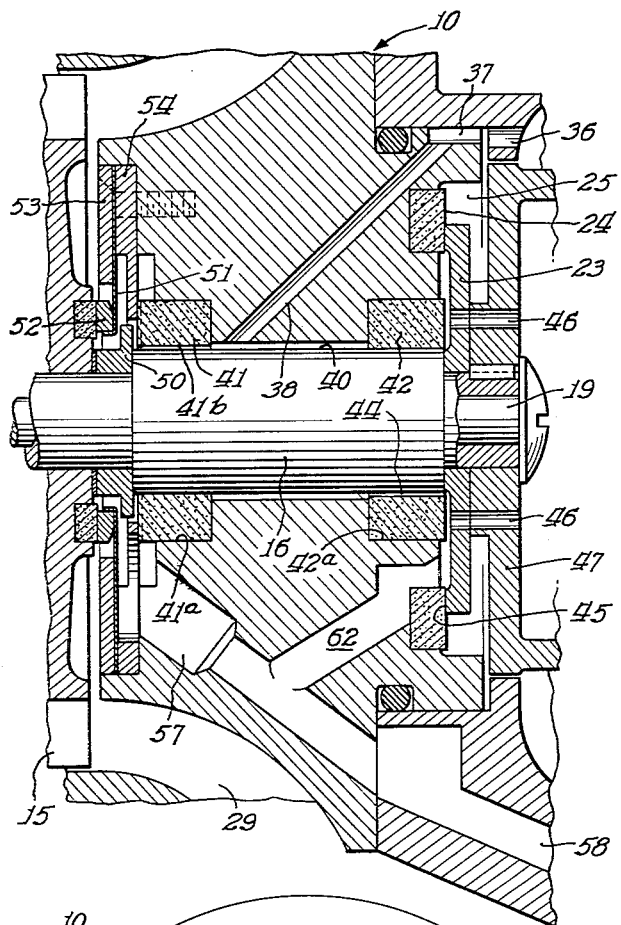

2,715,367

PUMP AND TURBINE FOR JET POWER UNIT

Gustav Kodet, Cleveland, Norman B. Dewees and Leland R. Melvin, Willoughby, and Louis G. Burns, Painesville, Ohio, assignors to Borg-Warner Corporation, Chicago, Ill., a corporation of Illinois Application April 6, 1949, Serial No. 85,884

9 Claims. (Cl. 103—87)

This invention relates to a pump, and more particularly to an air turbine driven fluid pump.

Air turbine driven fluid pumps are sometimes employed in conjunction with jet-type aircraft engines. Such pumps may be employed, for example, to inject water with the fuel or to inject fuel in the after-burner. In one such application air pressure for driving the turbine section of the pump is supplied from the jet engine compressor and the absolute pressure of the air will vary from 45 pounds per square inch to 90 pounds per square inch. The fluid pressure on the other hand delivered by the pump will be on the order of 250 to 400 pounds per square inch. The great disparity between these pressures produces a difficult thrust problem where the air turbine is mounted on and drives the same shaft on which the fluid impeller is mounted, this being the usual arrangement.

In such pumps ball bearing type thrust assemblies are not always suitable because of the difficulty of lubrication and cooling at high operational speeds. Furthermore, in any such arrangement, it is necessary that a certain freedom of movement be provided, that is to say that the shaft be free to float in order to avoid binding as the relative dimensions of the parts change with changes in temperature. Reversals of thrust may occur in such systems, however, and this seriously restricts the allowable tolerances which in turn increases the liability to operational failure.

An object of the present invention is to provide a new and improved air turbine driven fluid pump.

A further object of the present invention is to provide an air turbine driven fluid pump wherein the thrust of the air driven turbine rotor is balanced against that of the fluid impeller in such manner as to develop a relatively small resultant force which may be used to establish a desirable bearing condition for a thrust washer associated with the driven shaft to thereby provide a simple and efficient pump.

In accordance with one embodiment of this invention, an air turbine driven fluid pump may be provided comprising an air driven turbine, the rotor of which is secured to one end of a shaft, to the other end of which is secured the fluid impeller of a fluid pump. The axial thrust applied to the shaft by the air turbine rotor is counterbalanced by utilizing a portion of the output of the fluid pump to apply pressure to controlled pressure areas on either side of a thrust balancing washer or disc, mounted on the shaft adjacent the fluid impeller, in such manner as to positively position the thrust washer with respect to an adjacent bearing surface. The fluid from the pump is employed not only to counterbalance the thrust pressure applied to the shaft from the air turbine rotor but also to lubricate the moving parts of the assembly.

Other objects and advantages of the present invention will be apparent from the following detailed description taken in conjunction with the drawings wherein:

Fig. 1 is a longitudinal sectional view of an air turbine driven fluid pump constructed in accordance with one embodiment of this inventon;

Fig. 2 is an enlarged, transverse, sectional view taken along the line 2—2 of Fig. 1;

Fig. 3 is a transverse, sectional view taken substantially along the line 3—3 of Fig. 1;

Fig. 4 is a fragmentary, enlarged, sectional view of the fluid impeller portion of the pump shown in Fig. 1; and Fig. 5 is an enlarged, sectional view taken substantially along the line 5—5 of Fig. 2.

Referring now to the drawings, and particularly to Fig. 1 thereof, it will be seen that the pump of this invention comprises a generally cylindrical, three-section housing 10, the sections being rigidly held together as by bolts 11. Air inlet 12 is provided at the left end of the housing, as viewed in Fig. 1, and a fluid inlet 13 is provided at the right end of the housing. Air entering inlet 12 passes through turbine stator blades 14 and drives turbine rotor 15, which is mounted on the left end of a shaft 16, journaled in the mid section of the housing body, as will be hereinafter more fully described. The fluid entering the pump through the inlet 13 is pumped by an impeller 17 which, in the embodiment shown, is of the centrifugal type, and which delivers fluid under pumping pressure through an outlet duct 18, shown in Fig. 2. Impeller 17 is secured to the right end of shaft 16 by bolt 19 which is threaded into the shaft 16. At the outlet end of the duct 18 there is provided a check valve designated generally at 21 whereby back flow is prevented and adjacent the check valve is mounted a pressure responsive switch designated generally at 22 whereby when the fluid supply is exhausted and air is being pumped by the impeller 17, suitable mechanism (not shown) is actuated to turn off the air supply to the air driven turbine to prevent damage to the pump from overspeeding.

In the use for which this pump is intended, it is necessary that the pump deliver fluid at very high pressure, that is, a pressure on the order of 250 to 400 pounds per square inch. At the same time, since the pump is intended for use in aircraft, its dimensions must be kept as small as feasible. Accordingly, in order to develop the required power, it is the practice to operate the turbine at extremely high rotational speeds, that is speeds on the order of 25,000 R. P. M. and higher, and this, of course, necessitates a high pressure air supply to the turbine rotor assembly. The high pressure air flow, which may be on the order of 45 to 90 pounds per square inch or higher, applied to the rotor blades from the left, as viewed in Fig. 1, tends to force the driven shaft 16 and associated parts to the right and would, if not compensated in some manner, produce a side bearing pressure, that is, a pressure axially of the shaft of such high value as to rapidly wear the bearing surfaces as well as to decrease the efficiency of the pump. In accordance with this invention, however, the various pressure areas present in the pump are balanced one against the other in such manner that there is produced a resultant pressure of sufficiently reduced amount so that it may be employed to establish a definite location and bearing pressure of a thrust disc or washer 23 with respect to an adjacent bearing surface 24, the disc 23 being mounted rigidly on the driving shaft 16 in a recess or chamber 25 formed in the right end of the middle housing section adjacent the left side of impeller 17. The bearing surface 24 is provided by a ring of suitable bearing material mounted on the inner side of recess 25, that is, in the right end wall of the middle housing section. The bearing ring 24 has a somewhat greater outside diameter than disc 23, but is of sufficient width to provide a suitable bearing surface for the peripheral portion of disc 23. This is accomplished in a manner which will be apparent from the following detailed description.

Referring to Fig. 1, air under high pressure enters the inlet 12 and is directed through outwardly flaring passages 26, integrally formed in the housing 10, through the blades 14 of the turbine stator. The turbine stator comprises an annular plate 27 at the periphery of which the blades may be integrally formed, as by casting, and the plate is secured to the housing 10 by a plurality of bolts 28, threaded into the left housing section. In accordance with usual practice, the stator blades are curved and set at an angle with respect to the rotor blades so as to direct the air stream against the rotor blades with maximum efficiency. After the air has passed through the rotor blades, it escapes through outwardly extending ducts 29 formed in the mid section of the housing 10.

Since this pump is designed to be used in a wide variety of applications, it has been found desirable to provide some means for controlling the air flow through the turbine section. In accordance with this invention, therefore, there is provided in the center of the inlet 12 a throttle 30 comprising a stem 31 mounted axially of the pump and having its right end threaded into a suitably threaded aperture 32 formed in the center of the left section of the housing 10. Throttle disc 33 is fitted over a reduced end portion 34 of the stem 31 and is retained in position thereon by transversely disposed pin 35, the throttle disc reducing, in effect, the size of the inlet orifice. Where the air supply is too great, then a large disc is employed and conversely, where a greater flow of air is desired a smaller disc is employed. In some cases, of course, it is feasible to omit the throttle assembly entirely.

Rotation of the shaft 16 causes the impeller 17 to rotate at the same speed and thereby to pump fluid through the inlet 13 and to discharge the fluid under high pressure through the outlet duct 18. As may be more clearly seen in Fig. 4, adjacent the upper portion of the impeller pump and thereby in the high pressure zone, there is provided a small, axially extending slot 36 whereby a small quantity of the fluid under high pressure is diverted and permitted to pass to the left side of the impeller and into the chamber 25 in which the thrust disc 23 is located. Fluid pressure is thus applied to the right side of the disc 23 and is exerted in a direction opposite to and opposing the direction of air pressure applied to the turbine rotor blades. The fluid pressure available is generally many times that of the air pressure and therefore sufficient pressure may be applied to the thrust disc to more than compensate for the pressure applied to the turbine rotor. Thus, there is, considering these two opposed pressures acting on the shaft 16, a resultant axial force to the left on the shaft 16 tending to seat the thrust disc 23 on the bearing surface 24.

This resultant pressure may be greater than desirable to provide an optimum bearing condition. Therefore, a passage 37 is formed in the housing adjacent the passage 36 and communicates at its right end with the thrust disc chamber 25. Passage 37 connects at its left end to a passage 38, formed in the mid section of the housing 10 and extends inwardly toward the central portion thereof to aperture 40 extending axially through the center of the middle section of the housing 10 and enclosing the shaft 16. At the left end of the aperture 40 a bearing ring 41 of suitable bearing material is provided in a recess 41a formed in the middle housing section. This ring encircles the shaft 16 and provides suitable bearing support for the left portion end thereof. A similar ring 42 is mounted in recess 42a formed in the right end of the middle housing section and also encircles the shaft 16, providing thereby a suitable bearing support for the right end of shaft 16. These rings are lubricated by the fluid supplied from the impeller pump 17, the aperture 40 through which the shaft 16 extends having a slightly greater internal diameter than the outside diameter of the shaft 16 to permit flow of the fluid therebetween. At the same time, a certain amount of fluid will pass by both of these rings, under pressure, and this fluid may be utilized to establish the desired bearing pressure for the thrust washer 23. Bearing ring 42 has an axially extending groove 44 formed therein to permit ready passage of fluid from the chamber 40 and the fluid pressure passing between the ring 42 and the shaft 16 is applied to the left side of the thrust disc 23 in opposition to the pressure applied to the right side of the disc.

It will be noted that the disc 23 has an annular shoulder or rim 45 integrally formed on the left side thereof which bears against the bearing surface 24. By suitably selecting the width of the rim 45, the effective pressure area on the left side of the thrust disc may be made smaller or greater as required to provide the desired compensation. The resultant thrust or bearing pressure also depends on the diameter of the thrust disc itself, and by making the thrust disc larger or smaller, the effect of fluid pressure applied to the two sides thereof may also be controlled.

The fluid on the left side of the disc 23 is vented to the inlet pressure of the fluid supply through a number of axially extending apertures 46 formed in the impeller blade supporting plate 47, and spaced radially from the center thereof so that their left ends terminate adjacent the bearing ring 42. There is a slight space between the left ends, however, of the apertures 46 and the right end of the bearing ring 42, so that passage of fluid is substantially unimpeded. By venting the fluid to inlet pressure, pressure loss is minimized and the flow rate, that is the return flow, is controlled in accordance with the needs of the system.

The bearing ring 41 is provided with an axially extending groove 41b formed therein to permit ready passage of fluid from the chamber 40 to the space between the left end of the center section of the housing portion and the turbine 15.

Fluid pressure passing between the shaft 16 and the ring 41 is applied to the right side of a thrust disc 50, of substantially smaller diameter than the thrust disc 23. Thrust disc 50 plays substantially no part in the thrust balancing feature of this invention and is intended primarily to prevent the rotating parts from moving too far to the right in the event that the direction of thrust is shifted, due, for example, to a sudden change in the pressures or to exhaustion of the fluid supply. In the event the shaft 16 and associated parts move to the right, then the thrust disc 50 engages the left face of the bearing ring 41, and thereby prevents either rotor 15 or impeller 17 from scoring the housing. However, normally there is no engagement between thrust disc 50 and bearing ring 41.

Fluid under pressure passes to the left over the periphery of thrust disc 50 and is exerted against a spring diaphragm 51 which carries an annular seal 52 so located as to bear against the right side of the turbine rotor. Diaphragm 51 is supported at its outer portion by a pair of plates 53 and 54 between which it is sandwiched and which plates are secured to the mid section of housing 10 by suitable bolts such as the bolt 55. The fluid pressure cooperates with the normal spring tension of the diaphragm to provide the required sealing pressure and thereby to prevent fluid from escaping into the turbine section of the pump. The spring diaphragm with the added force due to the fluid pressure thereon contributes to some extent to the counterbalancing of the turbine thrust and must be taken into account in the design of the pump, particularly the sizes of pressure areas on either side of thrust disc 23.

A return passage to the fluid inlet side of the impeller pump from the diaphragm chamber is provided by downwardly extending passage 57 formed in the middle portion of the housing 10 and having its left end in communication with the diaphragm chamber, the right end of the passage 57 extending to a passage 58 formed in the right section of the housing 10 which in turn connects to an upwardly extending passage 61 leading to the inlet 13 of the pump. A passage 62 similar to passage 57 connects to the left side of the thrust disc at its upper end and to the passage 57 adjacent its lower end to supplement the venting operation of the axial vent holes 46.

In order to obtain efficient operation of this pump, it is necessary to bleed all air from the fluid inlet side thereof prior to delivery of fluid. It has been found in accordance with this invention that this may be readily accomplished by providing a small by-pass passage 65, the lower end of which connects with the discharge duct 18 of the impeller pump 17, as shown in Fig. 2, and the upper end of which connects through a short coupling pipe 66 with an air pressure bleed valve assembly 67, shown in detail in Fig. 5. Referring to Fig. 5, it will be seen that the coupling pipe 66 may be threaded into inlet port 68 formed in the lower, left hand side of valve assembly housing 69. A valve block 70 is mounted in the housing 69 and a valve 71 has its stem 72 slidably journaled in the block 70, the valve 71 being disposed adjacent the left end of the block 70. Diaphragm 73 is mounted at the right end of stem 72 and has its periphery held tightly against the right side of the block 70 by a sealing collar or ring 74, which is held in position against the right side of the diaphragm by a large, externally threaded cap 75, threaded into the right end of the valve assembly housing 69. Adjacent the inner, right side of the diaphragm 73 a supporting washer 76 of substantially less external diameter than the internal diameter of ring 74 is mounted on stem 72 and serves to support the diaphragm 73 against a small washer 78 rigidly mounted on stem 72 on the opposite side of the diaphragm. The washer 76 also serves as a backer plate against which the left end of helical spring 77 bears, the right end of spring 77 bearing against the inner side of cap 75. It will be apparent, therefore, that spring 77 normally urges stem 72 to the left and thereby holds the valve 71 in open position.

In the operation of the pump, air passes through open valve 71, valve block passage 63 and then escapes through an aperture 80 formed in housing 69. However, when fluid begins to be pumped by the impeller 17, due to the restricted size of the orifice 80, the fluid, because of its greater viscosity, does not escape rapidly enough, pressure increases on the left side of the diaphragm 73, and the diaphragm is forced to the right against the pressure of spring 77, thereby seating the valve 71 and closing the air bleed path through the orifice 80. The valve 71 thereafter remains closed under the very high pressure delivered by the impeller pump.

The check valve 21 is intended primarily to prevent back flow of fluid when the impeller is not operating. However, the check valve 21 remains closed under spring pressure until after the air pressure bleed valve 71 has been closed to insure effective operation of the air bleed valve. The check valve 21 comprises a valve seat 81 formed at the exit end of the outlet duct 18 and a valve assembly comprising the valve disc 82 which seats on the seat 81 and a hollow stem 83 affixed to the center of disc 82 and extending upwardly therefrom. The upper portion of the stem 83 is slidably journaled in a cylindrical aperture 84 formed in check valve housing 85. A helically coiled spring 86 is compressed between the upper side of the valve disc 82, as viewed in Fig. 2, and the lower side of the housing 85, and urges the check valve toward closed position. The spring 86 is so chosen that dribbling of fluid is prevented, that is to say that delivery of fluid through the check valve does not occur until the impeller pump has built up a pressure great enough to overcome the counterpressure of the spring 86.

Pressure responsive switch assembly 22 associated with the discharge duct 18 of the impeller is provided to operate suitable mechanism (not shown) for shutting off the air supply to the air turbine when the fluid supply for the pump 17 is exhausted. If the load were removed, that is the fluid supply to the impeller pump 17 stopped, the turbine and the impeller would speed up to such an extent that there would be considerable danger of blade deflection due to centrifugal force. Tests have indicated that such deflection occurs in pumps of the type herein described at approximately 50,000 R. P. M. and that such speeds are readily obtained upon removal of the load to the pump 17. It will be noted from Fig. 1, that a brake shoe 87 is mounted at the inner end of the air inlet 13 in such a location that upon outward deflection of the blades of impeller 17, the tips of the blades will engage the shoe 87 and not score the housing.

The pressure responsive switch 22 comprises a plunger 90 having a piston 91 affixed to the left end thereof, the piston 91 being slidably journaled in a suitable chamber 92 formed in the right portion of the check valve housing 85. A small passage 93 leads from the chamber 92 to a second small passage 94 which connects to the outlet duct 18 and, thereby, regardless of the operation of check valve 21, whatever pressure is developed by pump 17 is applied to the piston 91. Helically coiled spring 95 has one end bearing against the right side of piston 91 and its opposite end bearing against a collar 96 adjustably threaded into the housing, and permitting adjustment of the compression force of the spring 95. The right end of plunger 90 is received in a micro switch 97 of conventional design having leads 100 and 101 extending therefrom. Normally, the leads 100 and 101 would extend through a suitable relay circuit to an electrically actuated valve controlling the air supply to the pump turbine.

In the operation of the pump of this invention, the air supply to the turbine may, for example, be started by closing a suitable switch (not shown) which may be connected in parallel with microswitch 97. This switch is maintained closed for a long enough period so that operation of the pump 17 causes a sufficient pressure to be developed in the pressure responsive switch chamber 92 to move the piston 91 to the right to thereby actuate the microswitch 97. Thereafter, the operator may release the actuating switch and the microswitch will maintain the circuit closed until the fluid supply to the fluid pump 17 is exhausted. Thereupon, the pressure in the chamber 92 will drop and the piston 91 moves to the left, thereby releasing the microswitch and actuating suitable means for shutting off the air supply. In this manner, overrunning of the pump is automatically prevented.

It will be evident from the foregoing that there are many thrust pressure areas in the pump of this invention effective to apply an axial pressure to the shaft 16 in one or the other direction. The primary pressure area, however, to be considered is that of the turbine rotor blades. The primary pressure area acting against the rotor blade area is that provided by the right face of the thrust balancing disc 23, as viewed in Figs. 1 and 4. This counterbalancing area is supplemented by the pressure area on the right side of sealing diaphragm 51. In the normal operation of the pump, the effect of these last two areas is more than sufficient to counterbalance the pressure area of the rotor blades and would produce a resultant bearing pressure on the thrust balancing disc 23 greater than desirable. But this resultant pressure is reduced by the expedient of applying fluid pressure to the left side of the disc 23, the effective area of which is reduced as required by the use of the rim 45. A wide variety of thrust conditions may be compensated by using thrust balancing discs of greater or less diameter and by changing the location and width of the rim 45. It has been found in practice that this thrust balancing feature of the present invention enables high rotational speed over sustained periods of operation without bearing failure.

Where herein the various parts of the air turbine driven fluid pump of this invention have been referred to as being located in a right or a left position, it will be understood that this is done solely for the purpose of facilitating description and that the references relate only to the relative position of the parts as shown in the accompanying drawings.

What is claimed is:

1. A thrust balancing arrangement for a pump including a housing, a shaft journaled in said housing, means for rotating said shaft, said rotating means applying an axial force to said shaft in one direction, a fluid impeller mounted on said shaft and driven by said shaft, a thrust balancing disc mounted on said shaft, bearing means mounted in said housing adjacent said thrust balancing disc to support any thrust load on said balancing disc, passage defining means applying the fluid pressure developed by said impeller to one side of said balancing disc to counteract the axial force applied to said shaft by said rotating means, passage defining means communicating the fluid pressure upstream of the impeller to the opposite side of said thrust balancing disc, and means on said opposite side of said thrust balancing disc reducing the effective area thereof whereby the effect of the pressure applied thereto may be controlled, said last-mentioned means comprising an annular shoulder formed on said opposite side of said disc and arranged to engage said bearing means.

2. A thrust balancing arrangement for a pump including a housing, a shaft journaled in said housing, means for rotating said shaft, said rotating means applying an axial force to said shaft in one direction, a fluid impeller mounted on said shaft and driven by said shaft, fluid inlet means associated with said impeller, a thrust balancing disc mounted on said shaft, bearing means mounted in said housing adjacent said thrust balancing disc, passage defining means applying the fluid pressure developed by said impeller to one side of said balancing disc to counteract the axial force applied to said shaft by said rotating means, passage defining means diverting a portion of the pressure applied to said one side of said disc and applying the diverted pressure to the opposite side of said thrust balancing disc, passage defining means venting the pressure applied to the opposite side of said disc to inlet pressure, and means on said opposite side of said thrust balancing disc reducing the effective area thereof whereby the effect of the pressure applied thereto may be controlled, said last-mentioned means comprising an annular shoulder formed on said opposite side of said disc and arranged to engage said bearing means.

3. A fluid impeller pump, an outlet duct associated with said pump, a check valve mounted in said outlet duct, and an air bleed valve connected to said outlet duct between said check valve and said pump, resilient means holding said air bleed valve normally open, and resilient means holding said check valve normally closed, said latter resilient means being selected to permit said check valve to open in response to a pressure effective to cause said normally open air bleed valve to close.

4. A thrust balancing arrangement for a pump including a housing, a shaft journaled in said housing, a turbine rotor mounted on said shaft and driving said shaft, a fluid impeller mounted on said shaft and driven by said turbine rotor, air inlet means operatively associated with said turbine rotor, fluid inlet means operatively associated with said fluid impeller, a thrust balancing disc mounted on said shaft, bearing means mounted in said housing adjacent said thrust balancing disc, means communicating the fluid pressure developed by rotation of said impeller against a portion of said disc to establish a definite bearing pressure relation between said disc and said bearing means, sealing means operatively associated with said turbine rotor, and means diverting a portion of the fluid pressure developed by rotation of said impeller against said sealing means to increase the sealing effect of said sealing means.

5. A thrust balancing arrangement for a pump including a housing, a shaft journaled in said housing, means rotating said shaft, said rotating means applying an axial force to said shaft in one direction, a fluid impeller pump mounted on said shaft and driven by said shaft, a thrust balancing disc mounted on said shaft, bearing means mounted in said housing adjacent said thrust balancing disc, means communicating the fluid pressure developed by said impeller pump against a portion of said disc to counteract the axial force applied to said shaft by said rotating means by establishing a definite pressure relation between said disc and said bearing means, and means including a normally closed valve connected in the discharge side of the impeller pump during the initial pumping operation of said impeller pump to insure rapid development of fluid pressure.

6. A thrust balancing arrangement for a pump including a housing, rotatable means including a shaft journaled in said housing, means rotating said shaft, said rotating means applying an axial force to said shaft in one direction, a fluid impeller pump mounted on said shaft and driven by said shaft, an outlet duct operatively associated with said pump, means communicating the fluid pressure developed by said impeller against a portion of said rotatable means to counteract the axial force applied to said shaft by said rotating means, and means effective during the initial pumping operation of said impeller pump to insure rapid development of fluid pressure, said means comprising a check valve mounted in said outlet duct, an air bleed valve connected to said outlet duct between said check valve and said pump, resilient means holding said air bleed valve normally open, and resilient means holding said check valve normally closed, said latter resilient means being selected to permit said check valve to open in response to a pressure effective to close said normally open air bleed valve.

7. A thrust balancing arrangement according to claim 6 wherein said air bleed valve has operatively associated therewith a diaphragm having a restricted orifice formed therein, said orifice being effective to permit air to escape through said air bleed valve when said valve is open, and the size of said orifice being sufficiently restricted so that upon application of fluid pressure thereto said diaphragm moves the air bleed valve to closed position against the force of the resilient means operatively associated therewith.

8. A thrust bearing arrangement for a pump comprising a housing, rotatable means including a shaft journaled in said housing, a turbine rotor mounted on said shaft driving the shaft, a fluid impeller mounted on said shaft and driven by said turbine rotor, air inlet means operatively associated with said turbine rotor, fluid inlet means operatively associated with said fluid impeller, means applying the fluid pressure developed by said impeller against a portion of said rotatable means to counteract the axial force applied to said shaft by said turbine rotor, sealing means operatively associated with said turbine rotor, and means diverting a portion of the fluid pressure developed by rotation of said impeller against said sealing means to increase the sealing effect of the sealing means and to add to the thrust counteracting effect of said fluid pressure applying means.

9. A thrust bearing arrangement for a pump comprising a housing, rotatable means including a shaft journaled in said housing, means rotating said shaft, said rotating means applying an axial force to said shaft in one direction, a fluid impeller pump mounted on said shaft and driven by the shaft, an outlet duct operatively associated with said pump, means applying the fluid pressure developed by said impeller against a portion of said rotatable means to counteract the axial force applied to said shaft by said rotating means, sealing means operatively associated with said rotating means, and means diverting a portion of the fluid pressure developed by rotation of said impeller against said sealing means to increase the sealing effect of the sealing means and to add to the thrust balancing effect of said fluid pressure applying means.

(References on following page)

References Cited in the file of this patent

UNITED STATES PATENTS

| | | |
|---|---|---|
| 1,348,633 | Dowd | Aug. 3, 1920 |
| 1,485,504 | Hollander | Mar. 4, 1924 |
| 1,600,346 | MacMurchy | Sept. 21, 1926 |
| 1,665,460 | Hollander et al. | Apr. 10, 1928 |
| 1,723,661 | Schellens | Aug. 6, 1929 |
| 1,860,817 | Peterson | May 31, 1932 |
| 1,910,811 | Peterson | May 23, 1933 |
| 2,042,533 | Kieser | June 2, 1936 |
| 2,124,681 | Jauch et al. | July 26, 1938 |
| 2,421,325 | Griswold | May 27, 1947 |
| 2,442,361 | Hulman | June 1, 1948 |
| 2,475,316 | Garraway | July 5, 1949 |

FOREIGN PATENTS

| | | |
|---|---|---|
| 21,810 | Great Britain | 1910 |
| 452,232 | Germany | Nov. 9, 1927 |